(12) United States Patent
Yajima (10) Patent No.: US 10,213,974 B2
(45) Date of Patent: Feb. 26, 2019

(54) LASER PROCESSING APPARATUS

(71) Applicant: TOPPAN PRINTING CO., LTD., Tokyo (JP)

(72) Inventor: Shunsuke Yajima, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/897,745

(22) Filed: Feb. 15, 2018

(65) Prior Publication Data

US 2018/0169978 A1 Jun. 21, 2018

Related U.S. Application Data

(63) Continuation of application No. PCT/JP2016/003884, filed on Aug. 26, 2016.

(30) Foreign Application Priority Data

Sep. 7, 2015 (JP) .................................. 2015-175577
Jan. 7, 2016 (JP) .................................. 2016-001752

(51) Int. Cl.
*B29C 71/00* (2006.01)
*B29C 65/16* (2006.01)
(Continued)

(52) U.S. Cl.
CPC ........ *B29C 71/0063* (2013.01); *B23K 26/064* (2015.10); *B23K 26/0732* (2013.01);
(Continued)

(58) Field of Classification Search
None
See application file for complete search history.

(56) References Cited

U.S. PATENT DOCUMENTS

| 4,868,006 A | 9/1989 | Yorkgitis et al. |
| 4,879,176 A | 11/1989 | Ouderkirk et al. |

(Continued)

FOREIGN PATENT DOCUMENTS

| EP | 2 189 270 A1 | 5/2010 |
| JP | S63-308042 A | 12/1988 |

(Continued)

OTHER PUBLICATIONS

International Search Report Issued in International Patent Application No. PCT/JP2016/003884 dated Nov. 15, 2016.

(Continued)

*Primary Examiner* — Andrew Smyth
(74) *Attorney, Agent, or Firm* — Foley & Lardner LLP (57) ABSTRACT

A laser processing apparatus capable of imparting heat sealing properties to a biaxially stretched polyester film through a method having high efficiency and high safety. The laser processing apparatus includes a laser oscillator, where a film formed of a single layer of a biaxially stretched polyester or a laminate containing a layer of a biaxially stretched polyester on the surface is irradiated with laser light emitted from the laser oscillator, to impart heat sealing properties to a region of the film irradiated with the laser light. The laser processing apparatus may include an optical element which shapes a spot profile of the laser light into a predetermined profile, and may also include a film mounting part which mounts the film.

7 Claims, 7 Drawing Sheets

(51) Int. Cl.
  *B23K 26/064* (2014.01)
  *C08J 7/12* (2006.01)
  *B23K 26/073* (2006.01)
  *B23K 26/08* (2014.01)
  *B23K 26/20* (2014.01)
  *B23K 26/082* (2014.01)
  *B23K 103/00* (2006.01)

(52) U.S. Cl.
  CPC .......... *B23K 26/0738* (2013.01); *B23K 26/08* (2013.01); *B23K 26/0821* (2015.10); *B23K 26/206* (2013.01); *B29C 65/16* (2013.01); *C08J 7/123* (2013.01); *B23K 2103/42* (2018.08); *C08J 2367/02* (2013.01)

(56) References Cited

U.S. PATENT DOCUMENTS

| | | | |
|---|---|---|---|
| 5,028,292 A | 7/1991 | Incremona et al. | |
| 5,032,209 A | 7/1991 | Shinbach et al. | |
| 5,582,752 A * | 12/1996 | Zair | A61B 18/20 219/121.66 |
| 6,074,097 A * | 6/2000 | Hayashi | B23K 26/0846 383/208 |
| 6,909,865 B2 * | 6/2005 | Nagashima | G03G 15/0884 399/106 |
| 7,931,853 B2 * | 4/2011 | Plummer | C04B 35/565 264/646 |
| 2005/0036190 A1 | 2/2005 | Tanaka | |
| 2005/0109452 A1 | 5/2005 | Basque et al. | |
| 2010/0185171 A1 | 7/2010 | Muramatsu et al. | |
| 2013/0259407 A1 | 10/2013 | Muramatsu et al. | |

FOREIGN PATENT DOCUMENTS

| | | | |
|---|---|---|---|
| JP | H04-26339 B2 | 5/1992 | |
| JP | 2003-045820 A | 2/2003 | |
| JP | 2005-000952 A | 1/2005 | |
| JP | 2005000952 A * | 1/2005 | .......... B23K 26/0732 |
| JP | 2005-099427 A | 4/2005 | |
| JP | 2008-201507 A | 9/2008 | |
| WO | WO-2015/129316 A1 | 9/2015 | |
| WO | WO-2015/190110 A1 | 12/2015 | |

OTHER PUBLICATIONS

Notification of Reasons for Rejection issued in corresponding JP patent application No. 2015-175577 dated Jun. 21, 2016.

Notification of Reasons for Rejection issued in corresponding JP patent application No. 2015-175577 dated Nov. 1, 2016.

Extended European Search Report dated Sep. 4, 2018 in corresponding application No. 16843903.2.

* cited by examiner

Spot S

LASER PROCESSING APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/003884, filed on Aug. 26, 2016, which is based upon and claims the benefit of priority of Japanese Patent Application No. 2015-175577, filed on Sep. 7, 2015 and Japanese Patent Application No. 2016-001752, filed on Jan. 7, 2016, the entireties of which are hereby incorporated by reference.

TECHNICAL FIELD

The present invention relates to a laser processing apparatus.

BACKGROUND ART

Biaxially stretched polyester films, such as biaxially stretched polyethylene terephthalate films, have excellent strength, heat resistance, dimensional stability, chemical resistance, aroma retaining properties, and the like, and therefore are useful for various packaging materials. Therefore, it is expected that packaging bags, such as flexible pouches, formed by heat-sealing such biaxially stretched polyester films together, will be produced.

However, oriented films have poor heat sealing properties. In this regard, for example, Patent Literature 1 discloses a method of imparting heat sealing properties to a biaxially stretched polyester film by irradiating the surface of the film with short pulses of electromagnetic waves and modifying the surface.

CITATION LIST

[Patent Literature 1] JP H04-26339 B

SUMMARY OF THE INVENTION

Technical Problem

The method of short pulse irradiation disclosed in Patent Literature 1 requires generating short pulses of high output power using a xenon gas lamp or the like so as not to impair the internal orientation of the biaxially stretched polyester film. A xenon gas lamp has low energy efficiency and emits electromagnetic waves over a wide area, and therefore it is difficult to secure safety. Therefore, no efforts have been made toward practical use of a method of imparting heat sealing properties to a biaxially stretched polyester film.

The present invention has been made in view of such circumstances, and has an object of providing a processing apparatus capable of imparting heat sealing properties to a biaxially stretched polyester film by using a different, more efficient, and more safe method.

Solution to Problem

An aspect of the present invention for solving the problem set forth above is a laser processing apparatus including a laser oscillator. The apparatus irradiates laser light emitted from the laser oscillator to a film formed of a single layer of a biaxially stretched polyester or a laminate containing a layer of a biaxially stretched polyester on a surface, to impart heat sealing properties to a region of the film irradiated with the laser light.

Advantageous Effects of the Invention

The present invention provides a processing apparatus capable of imparting heat sealing properties to a biaxially stretched polyester film by using a more efficient, even highly efficient, and a safer, even highly safe, method.

DESCRIPTION OF THE REPRESENTATIVE EMBODIMENTS

It is to be understood that the following description of the embodiments are meant to be representative of the invention and that the invention is not necessarily limited to these embodiments.

First Embodiment (Laser Processing Apparatus)

Figure 1:
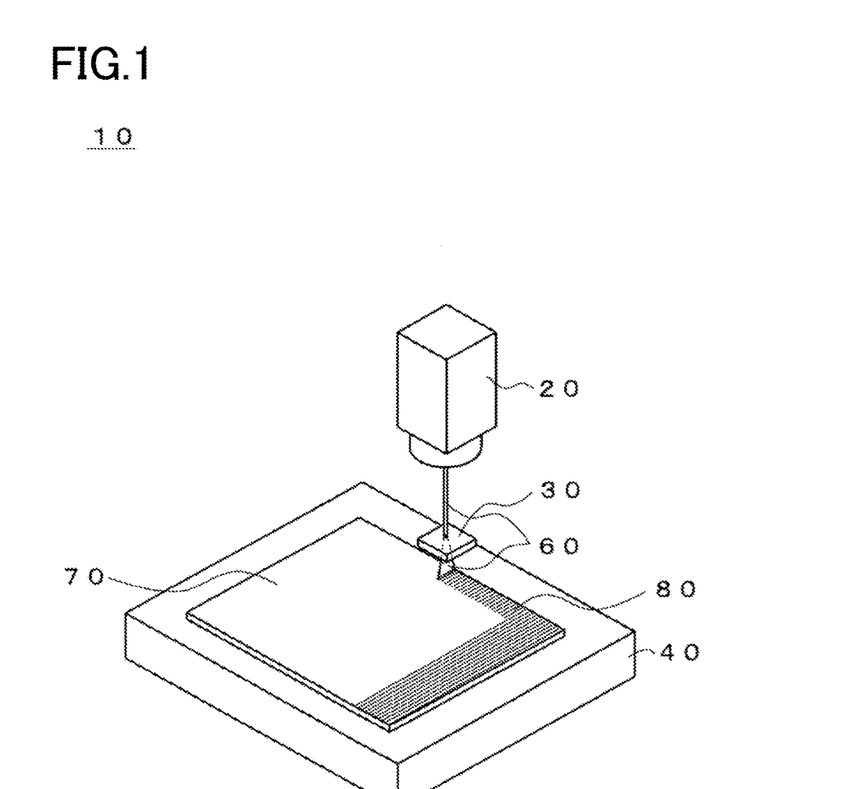
FIG. 1 is a schematic diagram illustrating a laser processing apparatus according to an embodiment of the present invention.

FIG. 1 is a schematic diagram of a laser processing apparatus 10 according to an embodiment. The laser processing apparatus 10 includes a laser oscillator 20 and an optical element 30. The optical element 30 shapes laser light 60 emitted from the laser oscillator 20 into a predetermined profile, and irradiates the laser light 60 to a workpiece of a single film made of a biaxially stretched polyester or a workpiece of a laminated film 70 (hereinafter referred to as film 70) containing a biaxially stretched polyester layer on the surface thereof. The laser processing apparatus 10 may further include a film mounting part 40 for mounting the film 70 thereon. The laser light 60 transmitted through the optical element 30 is irradiated to a predetermined spot of the film 70 to impart heat sealing properties to the spot. Safety is secured by using a laser oscillator capable of more easily controlling light irradiation than does a xenon lamp.

(Laser Oscillator)

A well-known laser oscillator may be used as the laser oscillator 20. In particular, a carbon dioxide gas laser is preferable, which includes infrared wavelengths where energy can efficiently be more easily absorbed into the film 70. The laser oscillator 20 is capable of generating the laser light 60 while adjusting the pulse width and the like with a control part 50. The number of laser oscillator(s) 20 is not limited to one, but a plurality of laser oscillators may be used.

(Optical Element)

The optical element 30 shapes a spot profile of the laser light 60 emitted from the laser oscillator 20 into a predetermined profile, for irradiation onto the film 70. The optical element 30 may be, for example, a diffractive optical element, polygon mirror, cylindrical lens or the like. The optical element 30 may be configured by combining a plurality of these optical elements as necessary.

Figure 2A:
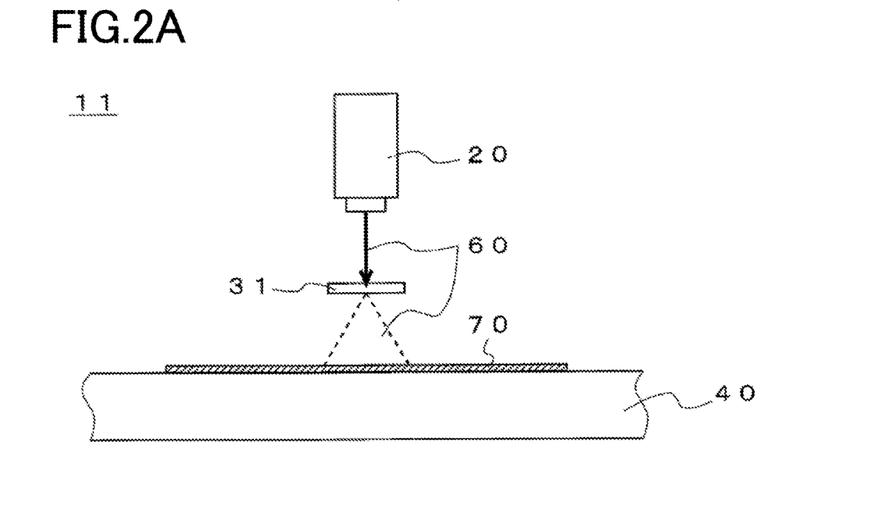
FIG. 2A is a cross-sectional view illustrating an example of an optical element.

FIG. 2A is a cross-sectional view illustrating a specific example of the optical element 30. FIG. 2A is a cross-sectional view illustrating a laser processing apparatus 11 using a diffractive optical element 31 as the optical element 30. The diffractive optical element 31 has a fine pattern of asperities on a substrate which is made of materials of ZnSe, quartz and the like depending on the wavelength of the laser light 60 used. The fine pattern of asperities is designed by computer simulation and the like on the basis of a predetermined spot profile and formed by etching, micromachining, replication, lithography or the like. The laser light 60 incident on the diffractive optical element 31 takes on a predetermined spot profile by being transmitted through the diffractive optical element 31.

Figure 3A:
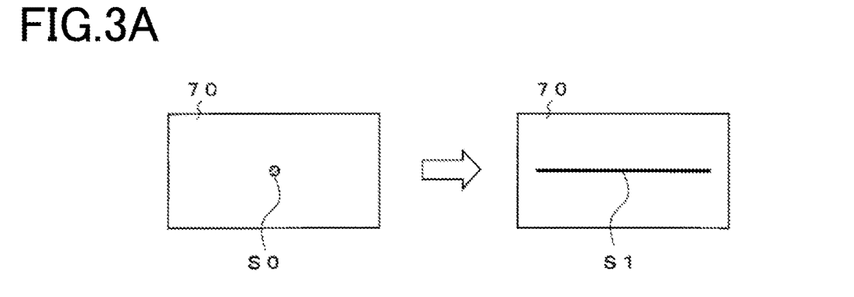
FIG. 3A is a diagram illustrating an example of a spot profile.
Figure 3B:
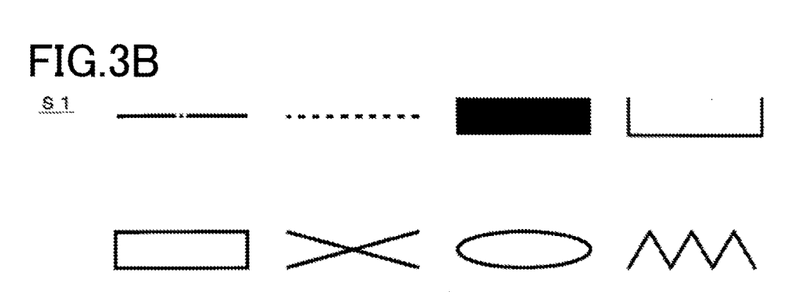
FIG. 3B is a diagram illustrating examples of the spot profiles.

FIGS. 3A and 3B show examples of a spot profile S0 produced by the laser oscillator 20 and a spot profile S1 shaped by the optical element 30. The optical element 30 shapes a dot-like spot profile of the laser light 60 emitted from the laser oscillator 20 (the left diagram of FIG. 3A) into, for example, a spot profile that is a line segment profile with a predetermined length (the right diagram of FIG. 3A). The spot profile S1 that can be formed with the diffractive optical element 31 is not limited to a line segment profile, but any profile may be adopted, as shown in FIG. 3B, by changing the pattern of asperities into, for example, a shape of a dotted line, a dash-dot line, a band of a given width, a four-sided quadrangle, waves, a U-shaped letter, an X-shaped letter, an elliptic circle, or the like.

Figure 4:
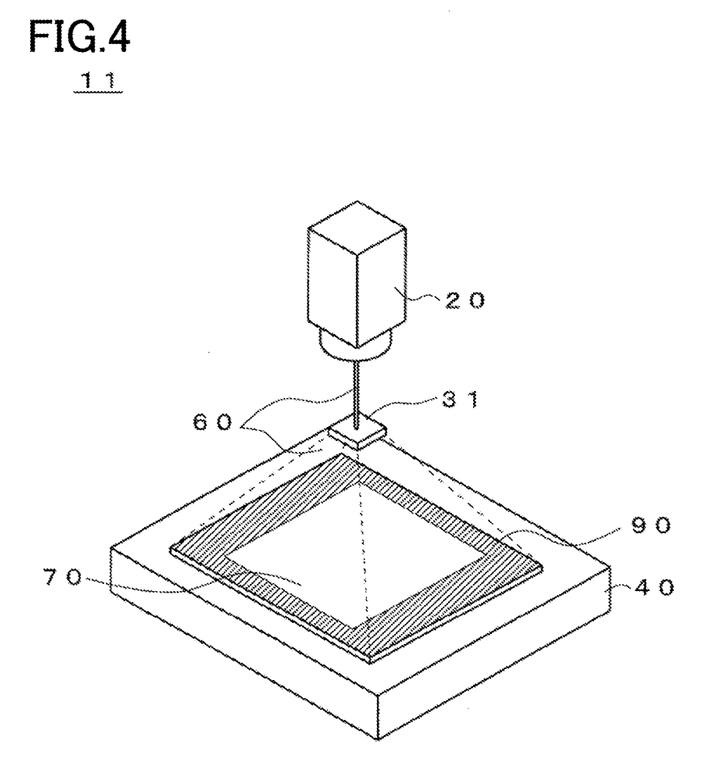
FIG. 4 is a schematic diagram illustrating a laser processing apparatus according to an embodiment of the present invention.

FIG. 4 shows the laser processing apparatus 11 where a spot profile of the laser light 60 shaped by the diffractive optical element 31 corresponds to a region scheduled for imparting heat sealing properties. As shown in FIG. 4, when forming a seal portion 90 imparted with heat sealing properties in a peripheral region of the rectangular film 70 of biaxially stretched polyester, the spot profile can be shaped into a frame that is the profile of the seal portion 90. In this way, by shaping the spot profile into a profile of a region scheduled for imparting heat sealing properties, the process of scanning with the laser light 60 is eliminated, and processing time taken for imparting heat sealing properties is greatly reduced. Further, a mechanism for driving the optical element 30 can be omitted, and thus the structure of the laser processing apparatus 10 can be simplified.

Figure 2B:
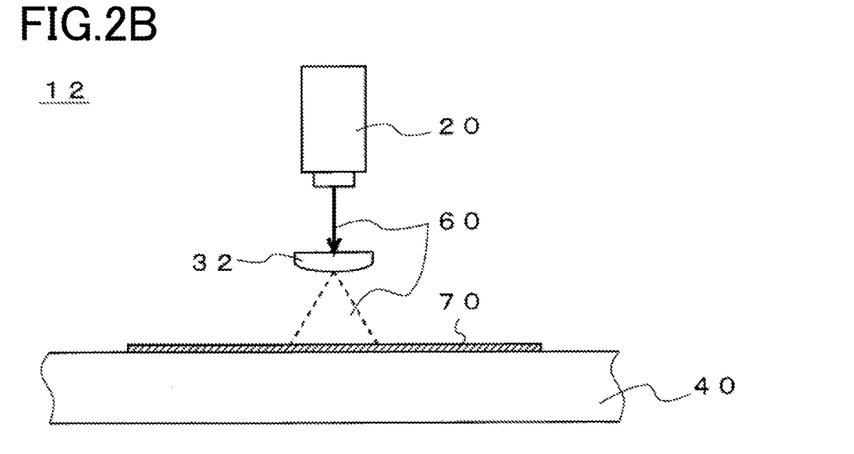
FIG. 2B is a cross-sectional view illustrating an example of an optical element.

FIG. 2B shows, as another example of the optical element 30, a cross-sectional view of a laser processing apparatus 12 using a cylindrical lens 32. The cylindrical lens 32 is comprised of a flat surface and a convex surface, and is installed such that the flat surface faces the laser oscillator 20 and the convex surface faces the film 70. The laser light 60 incident on the flat surface of the cylindrical lens 32 diffuses in the direction conforming to the curvature of the convex surface, and therefore, as shown in FIG. 3A, the spot profile appearing on the film 70 is shaped into a line segment profile having a predetermined length.

Figure 2C:
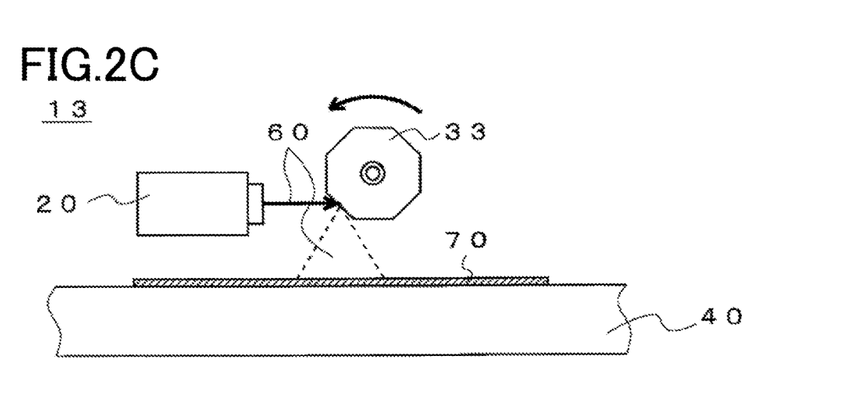
FIG. 2C is a cross-sectional view illustrating an example of an optical element.

FIG. 2C shows, as another example of the optical element 30, a cross-sectional view of a laser processing apparatus 13 using a polygon mirror 33. The polygon mirror 33 is comprised of a mirror having a polygonal body such as of an octagon, and a motor, not shown, that rotates the mirror. By irradiating the laser light 60 to the rotating mirror, the film 70 can be scanned with the laser light 60 reflected from the mirror, and the spot profile that is a line segment profile having a predetermined length shown in FIG. 3A is continuously shaped. Instead of the polygon mirror 33, a Galvanoscanner that is a combination of a mirror and a motor may be used.

(Method of Imparting Heat Sealing Properties)

Figure 5:
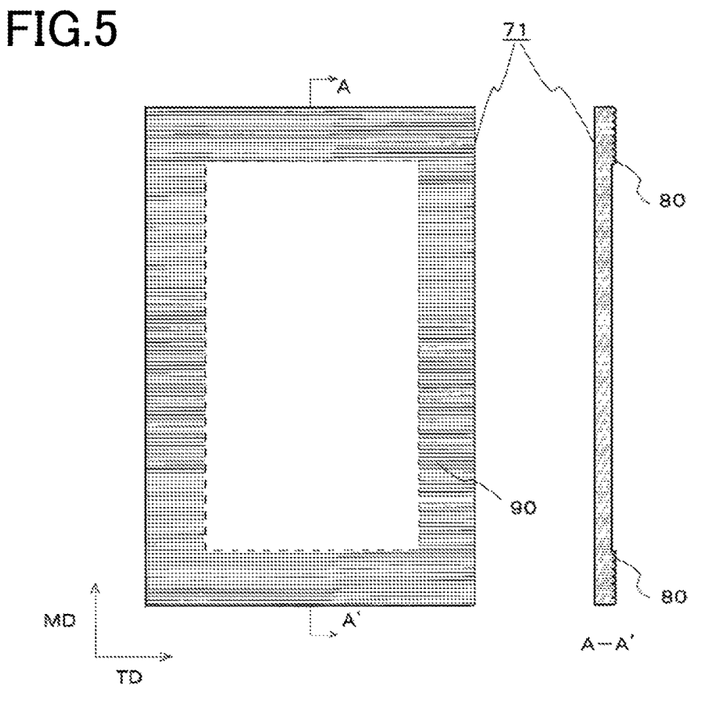
FIG. 5 is a plan view and a cross-sectional view illustrating a film irradiated with a laser.

FIG. 5 shows a plan view of an example of a film 71 made of a biaxially stretched polyester which is imparted with heat sealing properties through laser irradiation using the laser processing apparatus 10, and a cross section of the film taken along the line A-A' of the plan view. A peripheral region of the film 71 is irradiated with the laser light 60 to reduce crystallinity in the surface thereof and impart heat sealing properties thereto to thereby configure the seal portion 90. In the region where heat sealing properties are imparted in the example shown in the figure, processing traces 80 are formed along the scanning direction of the laser light 60.

Figure 6:
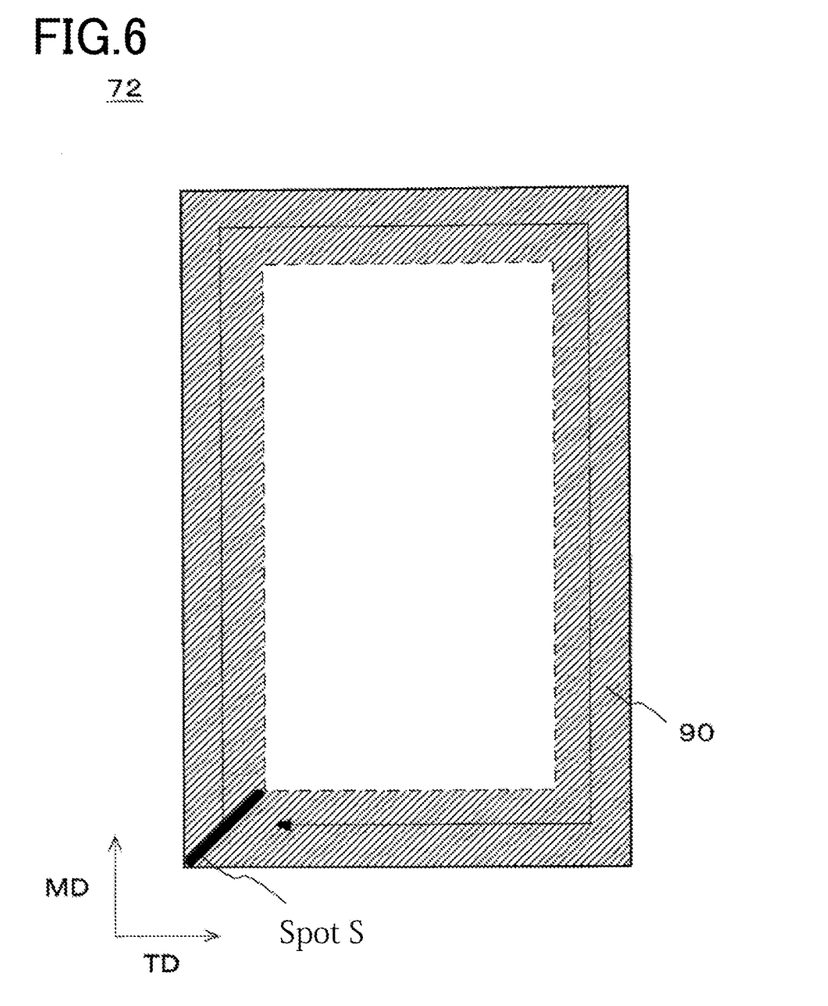
FIG. 6 is a plan view illustrating a film irradiated with a laser.

In the example shown in FIG. 5, the laser light 60 is shaped by the optical element 30 into a spot profile that is a line segment profile parallel to TD. Then, scanning with the laser light 60 is performed by combining an MD movement of the spot profile, with a TD movement thereof. In the scanning, specifically, every time the spot profile is moved in MD by a predetermined distance, the spot profile is moved in TD by a predetermined distance. FIG. 6 shows another example. In the example shown in FIG. 6, the spot profile of the laser light 60 is shaped into a spot S that is a line segment profile having a predetermined length and parallel to neither TD nor MD that is perpendicular to TD. The spot S is moved once throughout a peripheral region of a film 72 to irradiate the laser light 60 to almost the entire region of the seal portion 90 covering the same area as that of the example shown in FIG. 5.

Further, as another method of imparting heat sealing properties, the laser light 60 may be shaped into a spot profile that is the profile of the seal portion 90 by the diffractive optical element 31, for irradiation to the film 70. By shaping the spot profile into a profile of a region scheduled for imparting heat sealing properties, the process of scanning the film 70 with the laser light 60 is eliminated, and processing time taken for imparting heat sealing properties is significantly reduced. Further, a mechanism for driving the optical element 30 can be omitted, and thus the structure of the laser processing apparatus 10 is simplified.

Thus, by adequately determining and controlling the shape, size and movement of the spot profile of the laser light 60, scanning is preferably performed with the laser light 60 in the region where heat sealing properties are desired to be imparted in the film 70. In particular, as in the example shown in FIG. 6, if the spot profile of the laser light 60 is shaped into a line segment profile extending in a direction as shown, effective planar scanning can be performed when the movement direction of the spot is determined to be a direction not parallel to the extending direction. Further, by making the optical element 30 rotatable on a plane parallel to the film 70, the extending direction of the spot profile is easily changed, and the width of a scanning region is easily adjusted. Further, the spot profile of the laser light 60 may be planar, such as a profile of a band or a rectangle, for scanning over the film 70.

The processing traces 80 may be formed by reducing the crystallinity of the film 70 by laser irradiation. Further, the configuration of the processing traces 80 may vary depending on the power of the laser and energy density of the irradiation spot, irradiation speed and the like. For example, there may be cases where flatness is lost and a fine structure having asperities is formed, or there may be cases where whitening occurs and reflection ratio changes. Further, there may be cases where processing traces are not formed.

Thus, the method of imparting heat sealing properties by irradiation of the laser light 60, when compared to the method of imparting heat sealing properties by irradiation of short pulses of electromagnetic waves, can achieve high energy efficiency, and can secure safety because light (electromagnetic waves) is not emitted over a wide area even at high power operation. Further, the laser processing apparatus of the present embodiment does not involve movement of a heavy laser oscillator, and therefore the driving cost is reduced.

The film 70 does not have to be a single layer film of a biaxially stretched polyester. The laser processing apparatus of the present embodiment is applicable to various laminated films containing a biaxially stretched polyester at the surface. Specifically, the apparatus of the present embodiment can impart heat sealing properties to the surface of a biaxially stretched polyester layer of laminated films.

(Packaging Bag)

Figure 7:
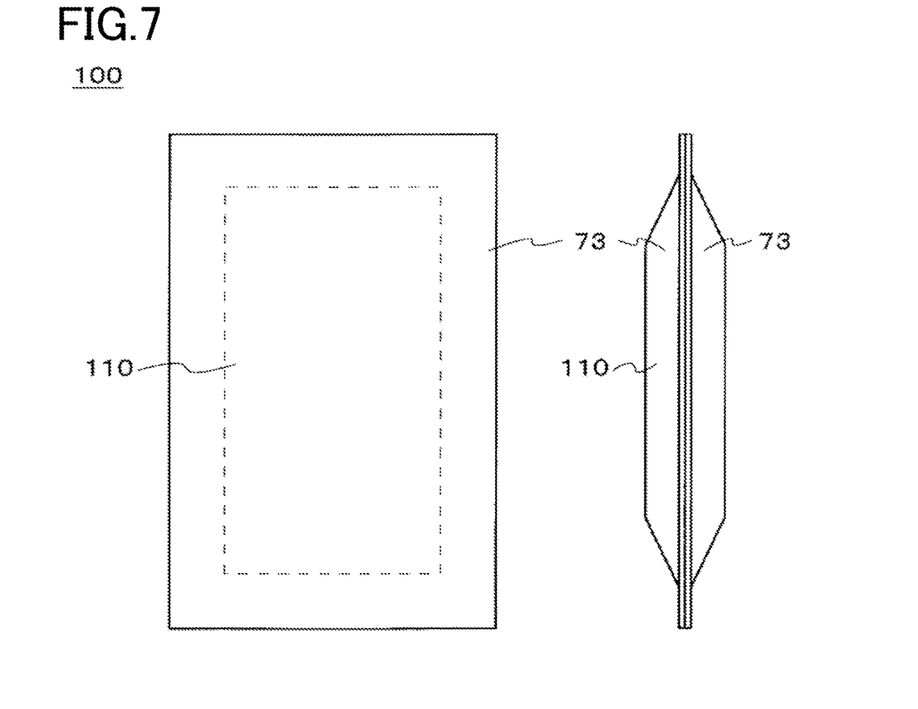
FIG. 7 is a plan view and a side view illustrating a packaging bag.

FIG. 7 is a plan view and a side view of a packaging bag 100. The packaging bag 100 is a four-side sealed bag related to an example of a packaging bag produced by using films 73 where the seal portion 90 is formed by the method mentioned above. When producing this packaging bag, two films 73 are overlapped with each other such that the surfaces formed with the seal portion 90 face each other, followed by heat sealing to form a storage part 110.

The type of the packaging bag produced by using the film 73 is not limited to a four-side sealed bag, but may be any type. For example, a three-side sealed bag formed by folding a single film in half and heat-sealing the overlapped peripheral portions, or a self-standing flexible packaging bag formed by placing a film folded in half between two films and sealing the peripheral portions, or the like can be used.

Second Embodiment (Laser Processing Apparatus)

Figure 8:
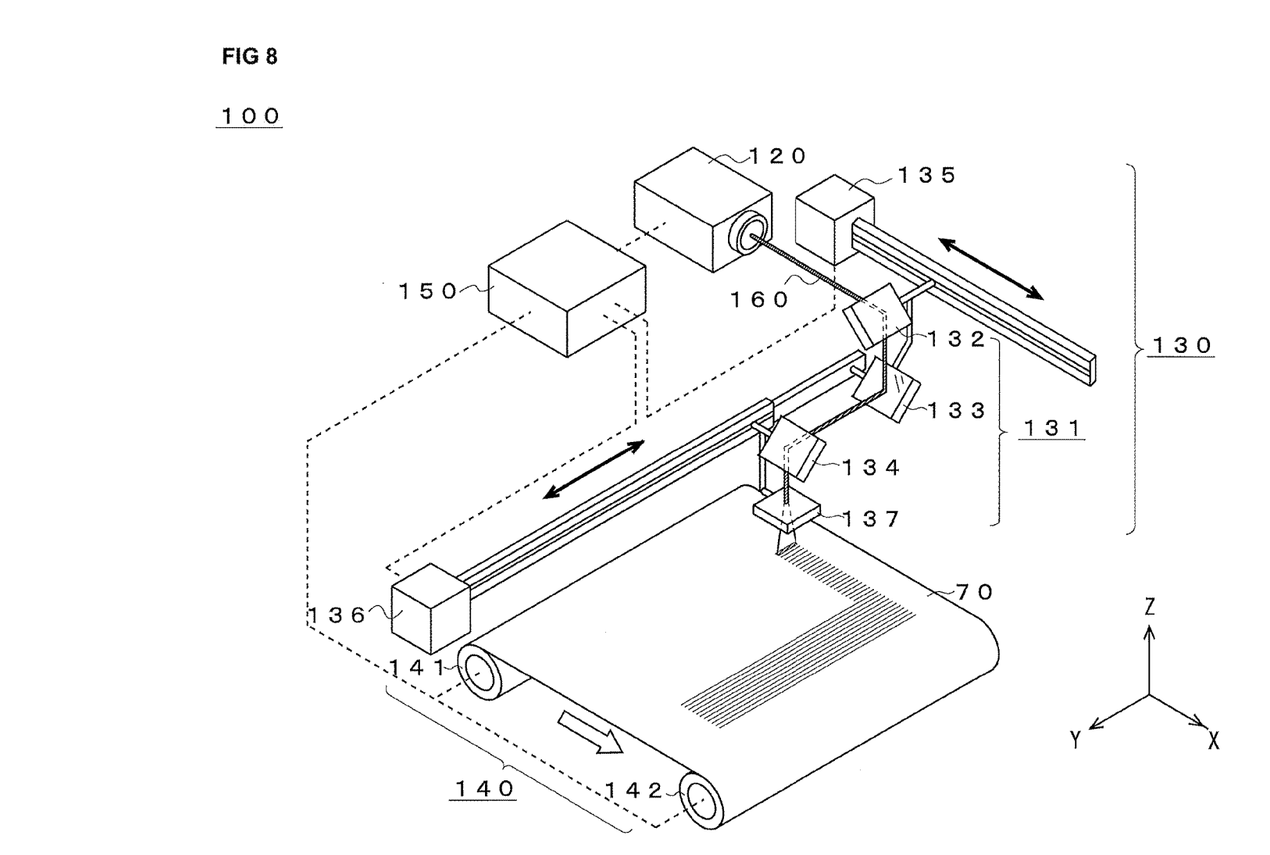
FIG. 8 is a schematic diagram illustrating a laser processing apparatus according to an embodiment of the present invention.

FIG. 8 is a schematic diagram of a laser processing apparatus 100 according to an embodiment. The laser processing apparatus 110 includes a laser oscillator 120, a laser irradiation part 130, a film mounting part 140, and a control part 150. The laser irradiation part 130 irradiates laser light 160 emitted from the laser oscillator 120 to a workpiece of a single layer film made of a biaxially stretched polyester or a workpiece of a laminated film 70 (hereinafter referred to as film 70) containing a biaxially stretched polyester layer on the surface. The film mounting part 140 is used for mounting the film 70 thereon. The control part 150 controls the laser oscillator 120, the laser irradiation part 130 and the film mounting part 140. The laser light 160 is irradiated by the laser irradiation part 130 to a predetermined spot of the film 70 to impart heat sealing properties to the spot.

(Laser Oscillator)

The laser oscillator 120 is the same as that of the first embodiment, and therefore the description is omitted.

(Laser Irradiation Part)

The laser irradiation part 130 adjusts the laser light 160 emitted from the laser oscillator 120 so as to have a predetermined spot profile or a scanning track, before being irradiated to the film 70. The laser irradiation part 130 is comprised of a laser guiding part 131, and a first driving part 135 and a second driving part 136. The laser guiding part 131 guides the laser light 160 emitted from the laser oscillator 120 onto the film 70 and changes a circular spot profile into a predetermined spot profile. The first and second driving parts 135 and 136 cause the laser guiding part 131 to move, for example, within a plane parallel to the surface of the film 70 to irradiate the laser light 160 to a predetermined spot of the film 70.

The laser guiding part 131 is an optical system that guides the laser light, and is comprised of, for example, a first mirror 132, second mirror 133 and third mirror 134, and a diffractive optical element 137. As shown in FIG. 8, the first mirror 132 is disposed at a predetermined distance from the laser oscillator 120 in the X-direction. The distance can be changed by the first driving part 135. The second mirror 133 is disposed at a predetermined distance from the first mirror 132 in the Z-direction. The first and second mirrors 132 and 133 are integrally coupled together, and therefore the distance between the two is constant. The third mirror 134 is disposed at a predetermined distance from the second mirror 133 in the Y-direction. The distance between the two can be changed by the second driving part 136. The diffractive optical element 137 is disposed at a predetermined distance from the third mirror 134 in the Z-direction. The third mirror 134 and the diffractive optical element 137 are integrally coupled together, and therefore the distance between the two is constant.

As shown in FIG. 8, by disposing each mirror at a predetermined angle, the laser light 160 emitted from the laser oscillator 120 in the X-direction is first reflected by the first mirror 132 and guided in the Z-direction, subsequently reflected by the second mirror 133 and guided in the Y-direction, and then guided in the Z-direction again by the third mirror 134, for irradiation onto the diffractive optical element. Finally, the laser light 160 delivered to the diffractive optical element 137 is changed into a desired spot profile, for irradiation onto the film 70.

The first and second driving parts 135 and 136 are constituted, for example, by air cylinders disposed in the X- and Y-directions, respectively, so as to move the coupled laser guiding part 131 on the X-Y plane, based on a signal received from the control part 150. As shown in FIG. 8, the laser guiding part 131 is coupled to the first driving part 135, and therefore can be driven in the X-direction. The third mirror 134 and the diffractive optical element 137 are coupled to the second driving part 136, and therefore are driven together in the Y-direction, independently of the first and second mirrors 132 and 133. The control part 150 decides the spot to be irradiated by the laser light 160, and then individually controls the first and second driving parts 135 and 136 to move the laser irradiation part 130 to the irradiation position above the film 70.

The laser guiding part 131 uses three mirrors. However, as long as the film 70 can be scanned with the laser light 160 emitted from the laser oscillator 120, the number of mirrors does not have to be three, but may be appropriately determined. Alternatively, mirrors may be omitted. For example, it is possible to use a Galvanoscanner that is a combination of a mirror and a motor, or a polygon mirror which is rotated with a motor to perform scanning by projecting a laser beam irradiated to the mirror. The spot profile of the laser light 160 diffracted by the diffractive optical element is not limited. Any profile may be adopted, for example, a profile of a dotted line, a dash-dot line, a band of a given width, a four-sided quadrangle, waves, a U-shaped letter, an X-shaped letter, an elliptic circle, or the like. To change the spot profile of the laser light 160, a different optical element such as a lens, including a cylindrical lens, may be used in place of the diffractive optical element 137. Further, a well-known mode can be adopted for the first and second driving parts 135 and 136 with a combination, for example, of a servo motor and a guide rail, besides the air cylinder.

(Film Mounting Part)

The film mounting part 140 fixes the film 70 at a position below the laser irradiation part 130 and feeds the film 70 when performing laser irradiation. The film mounting part 140 is comprised of, for example, an unwinding roller 141 which sends the film 70 to a position below the laser irradiation part 130, and a take-up roller 142 which sequentially takes up the film 70 after completion of laser irradiation. The unwinding roller 141 and the take-up roller 142 are driven by the control part 150.

The film mounting part 140 is not limited to a roller type as long as it can fix and feed the film 70 when performing laser irradiation. For example, the film mounting part 140 may be a mounting platform of a table shape capable of fixing and feeding a film of a cut up leaflet. Such a film mounting part 140 is driven by a driving part, not shown, while performing laser light irradiation, or driven alternately with laser light irradiation, thereby moving the film 70. Movement of the film 70 with the film mounting part 140 may be utilized for determining the position of laser irradiation, or may be utilized only for feeding in/out a leaflet or the like on a processing unit basis.

(Method of Imparting Heat Sealing Properties)

In the present embodiment, as with the film 71 of the first embodiment shown in FIG. 5, the peripheral region of the film is irradiated with the laser light 160 to reduce crystallinity in the surface thereof and impart heat sealing properties thereto to thereby configure the seal portion 90. In the region where heat sealing properties are imparted in the illustrated example, processing traces 80 are formed along the direction of scanning with the laser light 160.

For example, scanning with the laser light 160 as a dot-like spot is performed by combining a TD movement of the spot over the film 70 caused by the laser irradiation part 130, with an MD movement of the film 70 caused by the film mounting part 140. In the scanning, specifically, every time the spot is moved in TD by one row, the film 70 is moved in MD by a predetermined distance. Similarly to the first embodiment, as in the example shown in FIG. 6, the spot profile of the laser light 160 is shaped into a spot S that is a line segment profile having a predetermined length and parallel to neither TD nor MD that is perpendicular to TD. The spot S is moved once throughout a peripheral region of a film, for irradiation of almost the entire region of the seal portion 90, in a state where the film mounting part 140 is held still. Thus, by adequately determining and controlling the shape and size of the spot profile of the laser light 160, and the movement of the laser irradiation part 130 and the film mounting part 140, the laser light 160 can preferably scan over the region of the film 70 where heat sealing properties are desired to be imparted. In particular, as in the example shown in FIG. 6, if the spot profile of the laser light 160 is shaped into a line segment extending in a direction as shown, planar scanning can be performed when the movement direction of the spot is determined to be a direction not parallel to the extending direction. Accordingly, effective scanning can be performed without the need of high speed and sophisticated control. By installing the diffractive optical element 137 so as to be rotatable in relation to the passing direction of the laser light 160, the extending direction of the spot profile is easily changed and the width of the scanning region is more easily adjusted. The direction of mounting the film 70 on the film mounting part 140, and the direction of scanning with the laser light 160 do not have to be necessarily dependent on MD and TD.

In the present embodiment, a packaging bag as shown in FIG. 7, for example, can be produced similarly to the first embodiment using a film imparted with heat sealing properties.

Features of the embodiments may be adequately combined. For example, the various optical elements described in the first embodiment may be used as optical elements of the present embodiment. Such a laser processing apparatus is capable of imparting heat sealing properties to a biaxially stretched polyester film with higher safety and efficiency compared to the case of using a xenon gas lamp.

EXAMPLES

Laser processing apparatuses related to Examples and Reference Examples of the first embodiment were constructed, and biaxially stretched polyethylene terephthalate films each having a 100 μm thickness were prepared as examples of a biaxially stretched polyester film. In each film, a band-like heat sealing portion was formed in a 70 mm×14 mm irradiation area. The processing time periods for forming the respective heat sealing portions were compared.

Laser light was irradiated using a laser oscillator 20 capable of emitting carbon dioxide gas laser light of a 10.6 μm wavelength having a dot-like spot profile of a 0.14-mm or 14-mm diameter. Whether sufficient heat sealing properties were imparted due to lowering of crystallinity in the film was determined by calculating the reduction ratio of crystallinity. The calculation was based on the absorbance of a portion of the film before and after laser irradiation, measured with an FT-IR (Fourier transform infrared spectrophotometer) according to ATR (attenuated total refection). Specifically, when crystallinity fell by 30% or more compared to that before irradiation, it was determined that sufficient heat sealing properties were imparted.

Example 1-1

A laser processing apparatus 11 was constructed to irradiate laser light 60 at power of 10 W with a dot-like spot profile of a 14-mm diameter, to the diffractive optical element 31 which was made of ZnSe and capable of shaping the laser light 60 into a 14 mm×0.14 mm line segment profile. Using the apparatus 11, a heat sealing portion was formed by irradiating the laser light 60 to the irradiation area, while scanning the area.

Example 1-2

A laser processing apparatus 12 was constructed to irradiate laser light 60 at power of 30 W with a dot-like spot profile of a 14-mm diameter, to the cylindrical lens 32 which was capable of shaping the laser light 60 into a 14 mm×0.14 mm line segment profile. Using the apparatus 12, a heat sealing portion was formed by irradiating the laser light 60 to the irradiation area, while scanning the area.

Example 1-3

A laser processing apparatus 13 was constructed to irradiate laser light 60 at power of 100 W with a dot-like spot profile of a 14-mm diameter, to the polygon mirror 33 which was capable of shaping the laser light 60 into a 14 mm×0.14 mm line segment profile of. Using the apparatus 13, a heat sealing portion was formed by irradiating the laser light 60 to the irradiation area, while scanning the area.

Example 1-4

A laser processing apparatus 11 was constructed to irradiate laser light 60 at power of 250 W with a dot-like spot profile of a 14-mm diameter, to the diffractive optical element 31 which was made of ZnSe and capable of shaping the laser light 60 into a 14 mm×0.14 mm line segment profile. Using the apparatus 11, a heat sealing portion was formed by irradiating the laser light 60 to the irradiation area, while scanning the area.

Example 1-5

A laser processing apparatus 11 was constructed to irradiate laser light 60 at power of 100 W with a dot-like spot profile of a 14-mm diameter, to the diffractive optical element 31 which was made of ZnSe and capable of shaping the laser light 60 into a 14 mm×3.5 mm rectangular profile. Using the apparatus 11, a heat sealing portion was formed by irradiating the laser light 60 to the irradiation area, while scanning the area.

Example 1-6

A laser processing apparatus 11 was constructed to irradiate laser light 60 at power of 250 W with a dot-like spot profile of a 14-mm diameter, to the diffractive optical element 31 which was made of ZnSe and capable of shaping the laser light 60 into a 14 mm×3.5 mm rectangular profile. Using the apparatus 11, a heat sealing portion was formed by irradiating the laser light 60 to the irradiation area, while scanning the area.

Example 1-7

A laser processing apparatus 11 was constructed to irradiate laser light 60 at power of 100 W with a dot-like spot profile of a 14-mm diameter, to the diffractive optical element 31 which was made of ZnSe and capable of shaping the laser light 60 into a 14 mm×14 mm square profile. Using the apparatus 11, a heat sealing portion was formed by irradiating the laser light 60 to the irradiation area, while scanning the area.

Example 1-8

A laser processing apparatus 11 was constructed to irradiate laser light 60 at power of 250 W with a dot-like spot profile of a 14-mm diameter, to the diffractive optical element 31 which was made of ZnSe and capable of shaping the laser light 60 into a 14 mm×14 mm square profile. Using the apparatus 11, a heat sealing portion was formed by irradiating the laser light 60 to the irradiation area, while scanning the area.

Reference Example 1-1

A laser oscillator was constructed to irradiate laser light at power of 10 W with a dot-like spot profile of a 0.14-mm diameter. Using the laser oscillator, a heat sealing portion was formed by irradiating the laser light to the irradiation area, while scanning the area.

Reference Example 1-2

A laser oscillator was constructed to irradiate laser light at power of 30 W with a dot-like spot profile of a 0.14-mm diameter. Using the laser oscillator, a heat sealing portion was formed by irradiating the laser light to the irradiation area, while scanning the area.

Reference Example 1-3

A laser oscillator was constructed to irradiate laser light at power of 100 W with a dot-like spot profile of a 0.14-mm diameter. Using the laser oscillator, a heat sealing portion was formed by irradiating the laser light to the irradiation area, while scanning the area.

Reference Example 1-4

A laser oscillator was constructed to irradiate laser light at power of 250 W with a dot-like spot profile of a 0.14-mm diameter. Using the laser oscillator, a heat sealing portion was formed by irradiating the laser light to the irradiation area, while scanning the area.

Assessment results are shown in Table 1.

TABLE 1

| | Laser output (W) | Optical element | Spot profile | Processing time (sec) |
|---|---|---|---|---|
| Example 1-1 | 10 | Diffractive optical element | Line segment | 5 |
| Example 1-2 | 30 | Cylindrical lens | Line segment | 2 |
| Example 1-3 | 100 | Polygon mirror | Line segment | 0.7 |
| Example 1-4 | 250 | Diffractive optical element | Line segment | 0.3 |
| Example 1-5 | 100 | Diffractive optical element | Rectangle 1 | 0.3 |
| Example 1-6 | 250 | Diffractive optical element | Rectangle 1 | 0.2 |
| Example 1-7 | 100 | Diffractive optical element | Rectangle 2 | 0.2 |
| Example 1-8 | 250 | Diffractive optical element | Rectangle 2 | 0.1 |
| Reference Example 1-1 | 10 | None | Dot | 20 |
| Reference Example 1-2 | 30 | None | Dot | 17 |
| Reference Example 1-3 | 100 | None | Dot | 15 |
| Reference Example 1-4 | 250 | None | Dot | 10 |

<Details of shaped spot profile>
Straight line: 14 mm × 0.14 mm
Rectangle 1: 14 mm × 3.5 mm
Rectangle 2: 14 mm × 14 mm
Dot: 0.14-mm diameter From the assessment results shown above, by forming the spot profile of the laser light 60, which the film 70 was irradiated with, into a line segment profile or a rectangular profile using the optical element 30, it was confirmed that controlling an irradiation position in scanning was facilitated, irradiation with laser light was efficiently performed, and processing time was reduced.

Laser processing apparatuses related to an example and a reference example of the second embodiment were constructed, and biaxially stretched polyethylene terephthalate films were prepared as examples of a biaxially stretched polyester film. In each film, a band-like heat sealing portion with a 14-mm width was formed. The processing speeds for forming the respective heat sealing portions in the length direction (the stretching direction of the band) were compared.

Example 2-1

A laser processing apparatus of the embodiment was constructed with a laser oscillator having power of 250 W and capable of emitting carbon dioxide gas laser light of a 10.6 μm wavelength, three mirrors, and a diffractive optical element made of ZnSe and capable of sending laser light having a spot profile that is a line segment profile with a 0.14-mm line width and a 14-mm length. The band-like region was scanned with the spot to impart heat sealing properties to the region. Load weight on each of the first and second driving parts was 3 kg. Processing speed was 50 m/min. No laser light leaked to irradiate portions other than the desired portion.

Reference Example 2-1

A laser oscillator having power of 30 W and capable of emitting carbon dioxide gas laser light of a 10.6 μm wavelength was moved to scan the band-like region with a circular spot of a 0.3 mm diameter to impart heat sealing properties to the region. Load on the driving part for moving the laser oscillator was 55 kg. Processing speed was 0.5 m/min. No laser light leaked to irradiate portions other than the desired portion.

From the results obtained from above, it was confirmed that heat sealing properties were safely imparted to the films by laser light. It was confirmed that installation of a laser irradiation part that guides laser light from a laser oscillator to a predetermined position, coupled with use of a diffractive optical element capable of changing a spot profile, eliminated the need of moving a heavy laser oscillator. Accordingly, it was confirmed that driving load was greatly reduced to further improve safety, and processing speed was concurrently significantly improved.

INDUSTRIAL APPLICABILITY

The present invention is useful for laser processing apparatuses for films and the like.

REFERENCE SIGNS LIST 10, 11, 12, 13, Laser processing apparatus; 20, Laser oscillator; 30, Optical element; 31, Diffractive optical element; 32, Cylindrical lens; 33, Polygon mirror; 40, Film mounting part; 50, Control part; 60, Laser light; 70, 71, 72, 73, Film; 80, Processing traces; 90 Seal portion; 100, Packaging bag; 110, Storage part; 100, Laser processing apparatus, 120, Laser oscillator; 130, Laser irradiation part; 131, Laser guiding part; 132, First mirror; 133, Second mirror; 134, Third mirror; 135, First driving part; 136, Second driving part; 137, Diffractive optical element; 140, Film mounting part; 141, Unwinding roller; 142, Take-up roller; 150, Control part; 160, Laser light.

What is claimed is:

1. A laser processing apparatus comprising
a) a laser oscillator;
b) a mount mounting a biaxially stretched polyester film; and
c) a laser irradiation part that adjusts a laser light emitted by the laser oscillator to have a predetermined spot profile and a scanning track before the laser lights irradiates the film,
the laser irradiation part comprises a laser guiding part, a first driving part and a second driving part;
the laser guiding part guides the laser light from the laser oscillator onto the film and changes a circular spot profile of the laser light into the predetermined spot profile, the first and the second driving parts move the laser guiding part respectively in a first direction and a second direction, each of which is parallel to a surface of the film, to provide the scanning track of the laser light;
wherein the laser guiding part comprises a diffractive optical element which changes the circular spot profile of the laser light into the predetermined spot profile; and
wherein the laser guiding part comprises a first mirror, a second mirror, a third mirror and the diffractive optical element, wherein each of the first, the second and the third mirrors is disposed at a predetermined angle, such that the laser light, which is emitted from the laser oscillator in the first direction is reflected by the first mirror and guided in a third direction, which is perpendicular to the surface of the film, then subsequently reflected by the second mirror and guided in the second direction and then guided in the third direction again by the third mirror into the diffractive optical element.

2. The laser processing apparatus of claim 1, wherein i) the first mirror is disposed at a first distance from the laser oscillator in the first direction and the first driving part changes the first distance; ii) the second mirror is disposed at a second distance from the first mirror in the third direction and the second distance between the first and the second mirrors is constant; iii) the second mirror and the third mirror is disposed at a third distance in the second direction and the second driving part changes the third distance; and iv) the diffractive element is disposed at a fourth distance from the third mirror in the third direction and the fourth distance between the diffractive element and the third mirror is constant.

3. The laser processing apparatus of claim 1, wherein the first and second driving parts are air cylinders.

4. The laser processing apparatus of claim 2, wherein the third mirror and the diffractive element, which are coupled to the second driving part, are driven in the second direction independently of the first and the second mirrors.

5. The laser processing apparatus of claim 1, further comprising a control part sending a signal to the first driving part and the second driving part to move the laser irradiation part to an irradiation position above the film.

6. The laser processing apparatus of claim 5, wherein the mount comprises an unwinding roller and a take-up roller, which are driven by the control part.

7. The laser processing apparatus of claim 1, wherein the mount fixes the film below the laser radiation part and feeds the film when performing laser radiation.

* * * * *